G. KOESIS & J. LÜKÖ.
AIR MOTOR.
APPLICATION FILED OCT. 7, 1913.
1,124,460.
Patented Jan. 12, 1915.
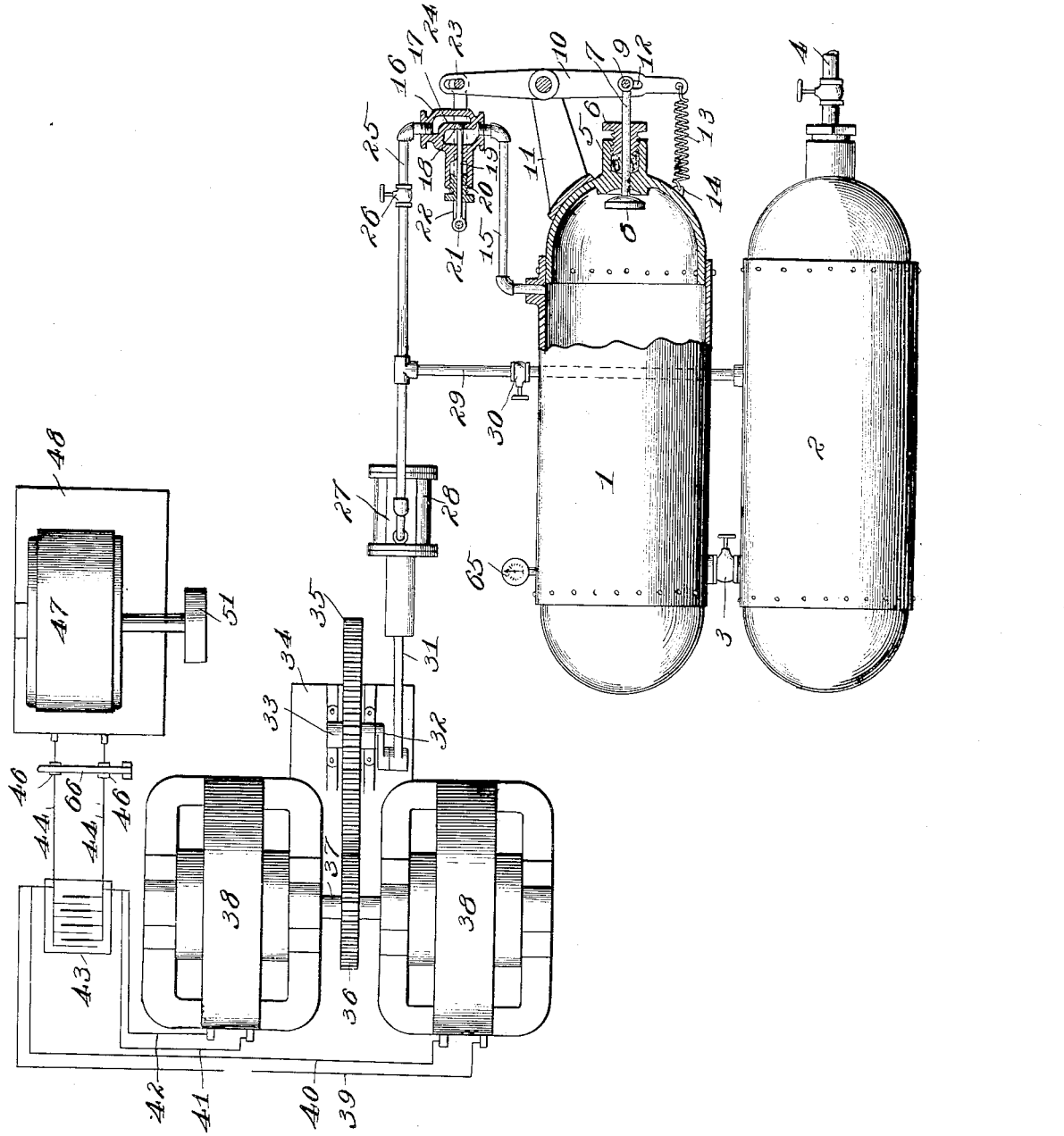
Witnesses:
Inventors:
Gyula Koesis
John Lükö

UNITED STATES PATENT OFFICE.

GYULA KOESIS, OF ST. CLAIRSVILLE, OHIO, AND JOHN LÜKÖ, OF LATROBE, PENNSYLVANIA.

AIR-MOTOR.

1,124,460.  Specification of Letters Patent.  Patented Jan. 12, 1915.

Application filed October 7, 1913. Serial No. 793,879.

*To all whom it may concern:*

Be it known that we, (1) GYULA KOESIS and (2) JOHN LÜKÖ, subjects of the King of Hungary, residing at (1) St. Clairsville and (2) Latrobe, in the counties of (1) Belmont and (2) Westmoreland and States of (1) Ohio and (2) Pennsylvania, have invented certain new and useful Improvements in Air-Motors, of which the following is a specification.

This invention relates to air motors.

The object of the invention is in a ready and practical manner, to employ compressed air for driving an engine and utilizing the power thus generated for driving a dynamo or dynamos, the current from which is utilized in forming a secondary battery, and the latter being connected up with a motor, which may be employed for driving any suitable piece of machinery.

With the above and other objects in view, as will appear as the nature of the invention is better understood, the same consists in the novel construction and combination of parts of an air motor and auxiliary parts, as will be hereinafter fully described and claimed.

In the accompanying drawings forming a part of this specification: the figure is a view in plan, partly in section, of an apparatus constructed in accordance with the present invention.

The apparatus embodies in part, two cylinders 1 and 2, which will be capable of withstanding an internal pressure, say of 1,000 pounds to the square inch, the cylinder 1 constituting the working cylinder, and the cylinder 2 an auxiliary cylinder, the latter cylinder being connected with the former by a valved joint 3, and provided at one end with a valved nipple or pipe 4 adapted to be connected with a suitable source of compressed air, or with a machine for compressing air.

Arranged in one end of the cylinder 1 is a stuffing box 5 provided with the usual gland 6 and working through the gland and stuffing box is a rod 7, the inner end of which carries an enlarged head 8, serving as a piston to receive the impact of air within cylinder 1, and the outer end of which is connected by a bolt 9 with a lever 10 pivoted intermediate its ends to a bracket 11 secured to the cylinder head, the bolt 9 being arranged to slide within a slot 12, thus to permit the lever to have the requisite rocking movement, for a purpose that will presently appear.

The head 8 is normally held out of engagement with a cylinder by a coiled spring 13, one end of which is connected to the lower end of the lever 10 and the other to a perforated boss 14 carried by the cylinder.

Tapped into the cylinder at any preferred point is one end of a pipe 15, the other end of which enters the bottom of a valve casing 16 provided with a septum 17 having a conical valve seat that is engaged by a cone-shaped valve 18 carried by the inner end of a rod 19, the latter working in a stuffing box 20 carried by the valve casing and having its outer end connected by a bolt 21 with one end of a yoke 22, the other end of which is connected by a bolt 23 with the upper end of the lever 10, a slot 24 being provided to permit free movement of the lever with respect to the bolt 23.

Tapped into the upper end of the valve casing 16 is one end of a pipe 25 carrying a valve 26, the other end of the pipe being tapped into the chest 27 of an air engine 28, of any preferred construction. The pipe 25 is connected by a branch pipe 29 with the cylinder 2, and is provided with a valve 30 by which to control the passage of fluid from the cylinder 2 to the pipe.

The arrangement of parts, viz., the rod 7, lever 10, spring 13, valve 18, rod 19, and yoke 23, constitute an automatic cut-off for cutting out of the system the cylinder 1 when its fluid pressure has dropped below a working force. As stated, the cylinder 1 will be capable of containing air under a pressure of 1,000 pounds to the square inch, but as will be obvious, no such power would be required to operate the various parts of the apparatus. Assuming that the air pressure on the piston head 8 holds the latter seated as long as there is a working pressure in the cylinder 1, it will be obvious that as soon as the pressure drops below this point, that the spring will rock the lever and close the valve 18, thus cutting out of the system the cylinder 1.

As usual, the engine is provided with a pitman rod 31, the outer end of which connects with a crank 32 carried by a shaft mounted in suitable bearings 33 on a bed 34, the shaft (not shown) having secured to it a gear wheel 35 that meshes with a similar gear wheel 36 carried by a shaft 37 common to the armatures of two dynamos designated generally 38. Leading from the dynamos are conductors 39, 40, 41, and 42 which are in circuit with a secondary battery 43, the leads 44 and 45 from which connect with knife switches 46, the latter being connected in any preferred manner with a motor 47.

This motor is supported upon a suitable base 48, and carries upon its shaft 49 a band pulley 51.

Having thus described the parts of the apparatus, the manner of its operation will now be given. Initially, the valves 26 and 30 will be closed, and the valves 3 and 4 opened, and compressed air will be admitted to the cylinder 2, thence passed through the valve 3 to the cylinder 1, the operation being continued until the desired pressure in the latter cylinder is obtained, which will be indicated by a gage 65 on the cylinder 1, the same pressure being present in the cylinder 2. When this pressure has been secured, the valve 4 is closed to prevent escape of air from the cylinder 2, as is also the valve 3, so that the air within the cylinder 2 will be an auxiliary supply. Now, in the event that the air in the cylinder 1 is reduced to a pressure below that of the working point, as pointed out, the valve 26 will be closed in order to prevent back pressure from the air in the cylinder 2 from operating on the valve 18, and the valve 30 will be opened, thus to permit air from the cylinder 2 to pass through the pipe 29 to the engine 28, the valve 30 having previously been opened, and this auxiliary supply of air will operate the dynamos through the mechanism described further to form the battery if necessary. When it is desired to start the machine working, the valve 26 will be opened, and permit air to pass through the pipe 15, valve casing 16, and pipe 25 to the engine 28. As the engine works, it will operate the dynamos, and thus form the secondary battery, the switch 66 between the latter and the motor being opened, so that no current can pass to the motor. Initially, the valve 18 is held open by a pressure on the head 8, (the effective working area of which is equal to the diameter of the rod 7) through the medium of the rod 7, lever 10, yoke 22 and the piston rod 19, and is held thus as long as the pressure in the cylinder 1 is sufficient to resist the retractive action of the spring 13. Now, as soon as the pressure in the cylinder 1 has dropped to a point where it will no longer be sufficiently strong to operate the engine 28, the valve 26 will be closed, and the valves 3 and 30 opened, thus permitting the air to pass from the cylinder 2 to the engine and continue its operation, or if preferred, the valve 3 could be opened and permit a portion of the contents of the cylinder 2 to pass into the cylinder 1 and maintain a pressure sufficient to operate the engine. From the foregoing description, it will be seen that although the improvements of this invention are simple in character, that they will be found thoroughly efficient for the purpose designed, and will result in the presentation of a power generating plant that may be easily and economically maintained.

What we claim is:

In an air motor, a pair of connected air holding cylinders, one of which constitutes the working and the other the auxiliary or storage cylinder, a rod mounted in one end of the working cylinder and provided with a head, a valve casing, a spring-retracted lever operatively connected with the rod and with the valve in the casing, an engine, connections between the working cylinder and the engine, a dynamo driven from the engine, a motor, and a secondary battery in circuit with the dynamo and the motor.

In testimony whereof we affix our signatures in presence of two witnesses.

GYULA KOESIS.
JOHN LÜKÖ.

Witnesses to signature of Gyula Koesis:
  Jos. J. Knappenberger,
  George Thornburg.

Witnesses as to signature of John Lükö:
  G. M. Fincik,
  M. Lükö.

Copies of this patent may be obtained for five cents each, by addressing the "Commissioner of Patents. Washington, D. C."